(12) United States Patent
Li (10) Patent No.: US 11,996,728 B2
(45) Date of Patent: May 28, 2024

(54) EARPHONE CHARGING CASE WITH ADAPTER FUNCTION

(71) Applicant: Shenzhen Yama Electronic Co., Ltd., Shenzhen (CN)

(72) Inventor: Wenjin Li, Shenzhen (CN)

(73) Assignee: SHENZHEN YAMA ELECTRONIC CO., LTD., Shenzhen (CN)

( * ) Notice: Subject to any disclaimer, the term of this patent is extended or adjusted under 35 U.S.C. 154(b) by 379 days.

(21) Appl. No.: 17/246,648

(22) Filed: May 2, 2021

(65) Prior Publication Data

US 2022/0209567 A1    Jun. 30, 2022

(30) Foreign Application Priority Data

Dec. 31, 2020  (CN) .......................... 202023349810.8
Mar. 19, 2021  (CN) .......................... 202110298341.1

(51) Int. Cl.
*H02J 7/02*       (2016.01)
*H04R 25/00*      (2006.01)

(52) U.S. Cl.
CPC .............. *H02J 7/02* (2013.01); *H04R 25/602* (2013.01); *H04R 2225/31* (2013.01)

(58) Field of Classification Search
CPC ........ H02J 7/02; H02J 7/0044; H02J 2207/40; H02J 7/0013; H02J 7/342; H04R 25/602;
(Continued)

(56) References Cited

U.S. PATENT DOCUMENTS 10,904,673 B1 *  1/2021  Zhang ................... H04R 25/602
11,283,278 B2 *  3/2022  Banerjee ............. H02J 7/00034
(Continued)

FOREIGN PATENT DOCUMENTS

CN    109768606 A  *  5/2019  ................ H02J 7/00
CN    209572135 U  *  11/2019 ................ H04R 1/10
(Continued)

OTHER PUBLICATIONS

Machine Translation of CN 114079314 A to Zhang (Year: 2022).*
Machine Translation of CN 108964476 B to Qin et al., (Qin) (Year: 2020).*

*Primary Examiner* — M Baye Diao
(74) *Attorney, Agent, or Firm* — Zhigang Ma (57) ABSTRACT

The present invention relates to an earphone charging case with adapter function, which comprises an AC/DC conversion circuit, a DC power output circuit and an earphone charging circuit. The DC power output circuit has a charging protocol circuit. The AC/DC conversion circuit is connected with the charging protocol circuit, the charging protocol circuit is connected with the earphone charging circuit, and the AC/DC conversion circuit is configured for accessing an alternating current and converting AC into DC. The earphone charging circuit is configured for charging a battery in the earphone charging case and earphones, and the DC power output circuit is configured for charging mobile terminals. Due to combination of two functions, the consumers will reduce purchase of single-function electronic products, and thus preventing more products from being idle; achieving optimization of product functions, playing a leading role in environmental protection.

14 Claims, 3 Drawing Sheets

(58) Field of Classification Search
CPC ............ H04R 2225/31; H04R 2460/17; H04R 1/1025
USPC ......................................................... 320/107
See application file for complete search history.

(56) References Cited

U.S. PATENT DOCUMENTS

| | | | |
|---|---|---|---|
| 11,451,076 B2 * | 9/2022 | Broders | ............... H04R 1/1025 |
| 11,653,732 B2 * | 5/2023 | Tsai | ...................... H02J 7/0044 |
| | | | 381/380 |
| 2011/0291611 A1 * | 12/2011 | Manor | ..................... H02J 7/02 |
| | | | 320/107 |
| 2021/0250708 A1 * | 8/2021 | Kheraj | ................. H02J 7/0044 |
| 2022/0140628 A1 * | 5/2022 | Perri | .................. H02J 7/00034 |
| | | | 381/315 |

FOREIGN PATENT DOCUMENTS

| | | | | | |
|---|---|---|---|---|---|
| CN | 108964476 B | * | 4/2020 | ........ | H02M 3/33584 |
| CN | 114079314 A | * | 2/2022 | ........... | H04R 1/1025 |
| EP | 3585063 A1 | * | 12/2019 | ........... | H02J 7/0021 |
| EP | 3934269 A1 | * | 1/2022 | ........... | H02J 7/0029 |
| EP | 3570557 B1 | * | 3/2022 | ............. | A45C 11/00 |
| KR | 20160043199 A | * | 4/2016 | ............. | A45C 11/00 |
| KR | 20210100472 A | * | 8/2021 | ........... | H04R 1/1025 |

* cited by examiner

EARPHONE CHARGING CASE WITH ADAPTER FUNCTION

TECHNICAL FIELD

The present invention relates to charging apparatus technical field and, more particularly to an earphone charging case with adapter function.

BACKGROUND

As we known, most of Bluetooth earphones in the market are equipped with charging cases, which provide convenience to carry and charge and has become one of standard accessories of the fashionable mobile phones. At the same time, power adapters for charging electronic products are also seemed as one of standard accessories of electronic products, for example mobile phones.

At present, a power adapter and an earphone charging case respectively are made to be a single and individual product. Internal structure and function of the two kinds of products have relatively little improvement. This leads to problems such as for example, single function, serious homogeneity of structure and function, limited use function of the charging bases, and so on.

SUMMARY OF THE INVENTION

Therefore, an earphone charging case with adapter function is provided, which combines a power adapting function with an earphone charging function to reduce the number of necessary accessories when going out and improve customer experience.

An earphone charging case with adapter function is provided, which comprises an AC/DC conversion circuit, a DC power output circuit and an earphone charging circuit. The DC power output circuit is provided with a charging protocol circuit, the AC/DC conversion circuit is electrically connected with the charging protocol circuit, the charging protocol circuit is electrically connected with the earphone charging circuit, and the AC/DC conversion circuit is configured for accessing an alternating current and converting the alternating current into a direct current. The earphone charging circuit is configured for charging a battery in the earphone charging case and earphones, and the DC power output circuit is configured for charging mobile terminals.

In a preferred embodiment, the AC/DC conversion circuit comprises an AC input end, a rectification bridge stack, a high-frequency transformer, and a synchronous rectification circuit. The AC input end is an input end of the AC/DC conversion circuit and is configured for connecting with the alternating current. The AC input end, the rectification bridge stack, the high-frequency transformer and the synchronous rectification circuit are electrically connected in turn.

Preferably, the AC/DC conversion circuit further comprises a power main control chip, an optoelectronic coupling circuit and a feedback circuit. The power main control chip is electrically connected with the high frequency transformer, the optoelectronic coupling circuit and the feedback circuit respectively. The feedback circuit is electrically connected with the high frequency transformer, and the optoelectronic coupling circuit is electrically connected with the synchronous rectification circuit.

Preferably, the DC power output circuit further includes a USB power output interface to charge the mobile terminals, and the USB power output interface is electrically connected with the charging protocol circuit.

Preferably, the earphone charging circuit comprises a DC/DC power conversion circuit, a charging management/lithium battery protection circuit, an earphone charging interface and a charging battery. The charging protocol circuit is electrically connected with the DC/DC power conversion circuit. The DC/DC power conversion circuit, the charging management/lithium battery protection circuit and the earphone charging interface are electrically connected in turn. The charging battery is electrically connected with the charging management/lithium battery protection circuit, and the earphone charging interface is configured to charge the earphones, and the charging battery is configured for energy storage of the earphone and charging the earphones.

Preferably, the charging protocol circuit has a charging protocol chip which has a plurality of pins. The plurality of pins beneficially comprises nine pins, i.e., from a first pin through a ninth pin. The synchronous rectification circuit has a rectification chip. The first pin and the third pin are electrically connected with the rectification chip, respectively. The second pin and the third pin are respectively electrically connected with the optoelectronic coupling circuit.

Preferably, the DC/DC power conversion circuit has a power conversion chip which has an IN end and an OUT end, the eighth pin of the charging protocol chip is connected with the IN end, and the OUT end is electrically connected with the charging management/lithium battery protection circuit.

Preferably, the optoelectronic circuit has photoelectric coupling sensors, which comprises a photoelectric coupling sensor U4-A and another photoelectric coupling sensor U4-B. The photoelectric coupling sensor U4-A is electrically connected with the charging protocol chip, and the photoelectric coupling sensor U4-B and the power main control chip are electrically connected to each other.

Preferably, the earphone charging case with adapter function has an enclosure which the AC/DC conversion circuit, the DC power output circuit and the earphone charging circuit are respectively arranged in. The enclosure is provided with an electric plug, earphone charging contacts and a charging output interface. The electric plug is configured for connecting an external power supply. The earphone charging contacts are electrically connected with the earphone charging interface, and the charging output interface is connected with the USB power output interface to charge electronic products, e.g., the mobile terminals.

Preferably, the enclosure is also provided with a receiving slot. The electric plug is configured to be capable of being overturned and installed in the receiving slot so that the electric plug is able be folded and received in the receiving slot, and the electric plug is further configured for connecting the alternating current.

In another embodiment of the present invention, another earphone charging case with adapter function is provided, which comprises an enclosure, an AC/DC conversion unit and a DC/DC conversion unit. The AC/DC conversion unit and the DC/DC conversion unit are respectively installed in the enclosure. The enclosure is provided with an electric plug for connecting with an external power supply and earphone charging contacts which are electrically connected with the DC/DC conversion unit. The enclosure is further provided with a charging output interface which is connected with the AC/DC conversion unit to charge the electronic products.

Preferably, the enclosure is further provided with a receiving slot. The electric plug is configured to be capable of being overturned and installed in the receiving slot so that the electric plug is able be folded and received in the receiving slot, and the electric plug is further configured for connecting the alternating current. The electric plug in a status of turning outward is vertical to one side or surface of the enclosure. The electric plug in a status of being folded in the receiving slot is substantially even with the side or the surface of the enclosure.

Preferably, the DC/DC conversion unit is a step-down converter. The AC/DC conversion unit is connected with the DC/DC conversion unit to convert output voltage of the AC/DC conversion unit into DC voltage for charging the earphones.

The earphone charging case with adapter function described above is provided with the AC/DC conversion circuit, the DC power output circuit and the earphone charging circuit. The AC/DC conversion circuit is configured to provide access to the alternating current (hereinafter referred to as AC) and convert AC into DC (i.e., direct circuit). The earphone charging circuit is configured to charge the battery and the earphones in the earphone charging case, and the DC power output circuit is used to charge the mobile terminal. Thus, charging operation for the terminal, the earphones and the earphone charging case can be achieved at the same time. Accordingly, this reduces the number of necessary accessories to be carried out, improves the function of charging case, and does not need an adapter for each electronic product to charge. As such, work efficiency and life convenience of consumers are increased. Due to the present earphone charging case combined with functions of two products, the consumers will reduce purchase probability of multiple electronic products, and thus preventing more products from being idle; achieving the optimization of product functions, playing a leading role in environmental protection.

DETAILED DESCRIPTION OF THE INVENTION

The foregoing and other exemplary purposes, aspects and advantages of the present invention will be better understood in principle from the following detailed description of one or more exemplary embodiments of the invention with reference to the embodiment(s) and accompanied drawings. It is understood to one skilled in the art that the following description with reference to the embodiment(s) and accompanied drawings is merely to explain concepts and principals of the present invention but should not be seemed as limitation to the scope of the present invention.

Figure 1:
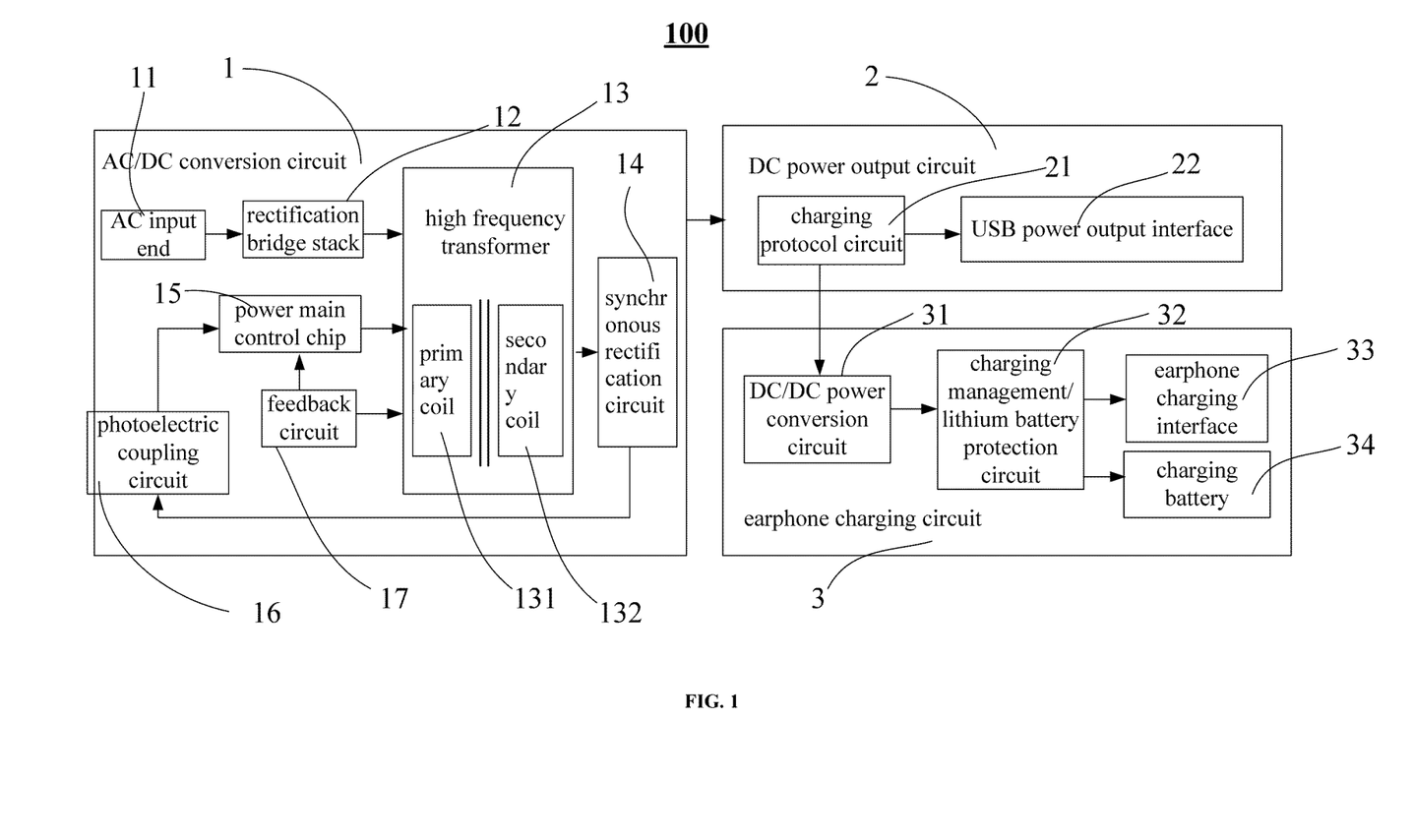
FIG. 1 is a schematic block diagram of an earphone charging case with adapter function in according to an embodiment of the present invention.

Please referring to FIG. 1, in accordance with an embodiment of the present invention, an earphone charging case 100 with adapter function is shown. The earphone charging case 100 with adapter function comprises an AC/DC conversion circuit 1, a DC power output circuit 2 and an earphone charging circuit 3. The DC power output circuit 2 is provided with a charging protocol circuit 21, the AC/DC conversion circuit 1 is electrically connected with the charging protocol circuit 21, the charging protocol circuit 21 is electrically connected with the earphone charging circuit 3, and the AC/DC conversion circuit 1 is configured for accessing an alternating current and converting the alternating current into a direct current. After being processed by the circuit 1, the direct current power is output to the DC power output circuit 2 and the earphone charging circuit 3 in two corresponding ways. The earphone charging circuit 3 is configured for charging a battery in the earphone charging case and earphones. The DC power output circuit 2 is configured for outputting 5 to 20V DC power supply to charge mobile terminals. The terminals include mobile phone, computer, tablet computer, mobile power supply and other electronic products. Further, the AC/DC conversion circuit 1, the DC power output circuit 2 and the earphone charging circuit 3 are respectively arranged reasonably according to corresponding regions to reduce mutual interference of electrical signals between these circuits.

Preferably, the AC/DC conversion circuit 1 comprises an AC input end 11, a rectification bridge stack 12, a high-frequency transformer 13 and a synchronous rectification circuit 14. The AC input end 11 is an input end of the AC/DC conversion circuit 1 and is configured to access 100-240V AC. The AC input end 11, the rectification bridge stack 12, the high-frequency transformer 13 and the synchronous rectification circuit 14 are electrically connected head to tail in turn.

Figure 2:
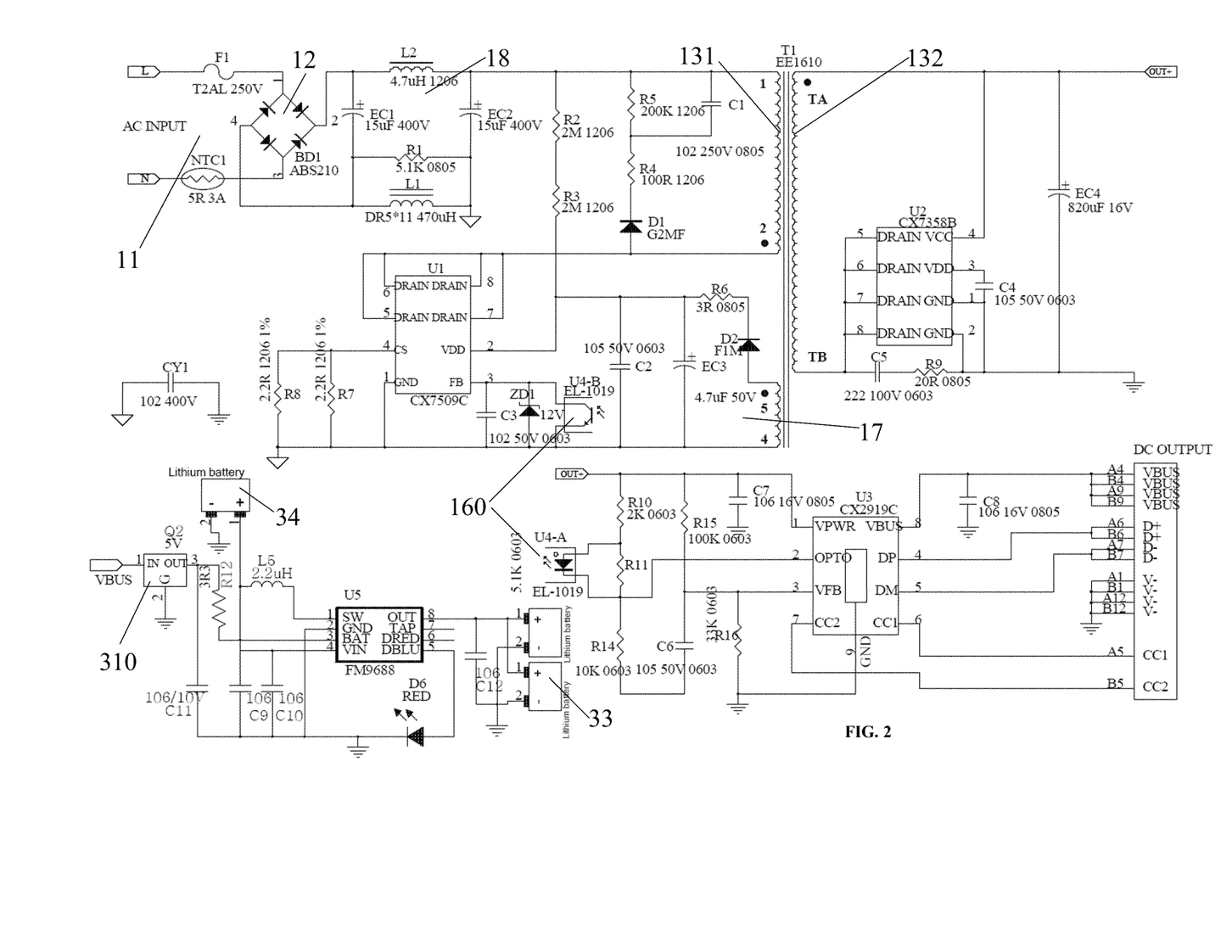
FIG. 2 is a schematic diagram of circuit structure of the earphone charging case with adapter function in according to the embodiment of the present invention.

Please referring to FIG. 2 with reference to FIG. 1, a filter circuit 18 is further interposed between the rectification bridge stack 12 and the high frequency transformer 13. The filter circuit 18 has capacitances and inductances and is configured for energy storage, wave filtering and anti electromagnetic interference. Specifically, the capacitors include a polar capacitance EC1 and a polar capacitance EC2, and the inductances include an inductance L1 and an inductance L2. Two ends of the inductance L1 are correspondingly connected with a negative pole of the polar capacitance EC1 and a negative pole of the polar capacitance EC2. Two ends of inductance L2 are correspondingly connected with a positive pole of the polar capacitance EC1 and a positive pole of the polar capacitance EC2. The negative poles of the two polar capacitors are also connected through a resistance R1, That is, the resistance R1 is connected to the two negative poles of the two polar capacitors in parallel with inductance L1. The positive and negative poles of the polar capacitor EC1 are respectively connected with the input rectification bridge stack. The positive pole of the polar capacitor EC2 is connected with the high frequency transformer 13, and the negative pole of the polar capacitor EC2 is connected with the inductance L1 and then grounded.

Specifically, the high frequency transformer 13 comprises a high frequency transformer primary coil 131 and a high frequency transformer secondary coil 132. The high frequency transformer primary coil 131 is connected with the filter circuit 18, and the high frequency transformer secondary coil 132 is connected with the synchronous rectification circuit 14. The high frequency transformer 13 further has functions of effectively and safely isolating the AC/DC conversion circuit 1 and the DC power output circuit 2.

Specifically, the synchronous rectification circuit 14 has a synchronous rectification chip U2 and a large capacity capacitance EC4. One end of the high-capacity capacitor EC4 is connected with one pin of the high rectification chip U2, and the other end of the high-capacity capacitor EC4 is grounded, for output energy storage filtering and anti electromagnetic interference. The synchronous rectification chip U2 is preferably CX7538B chip, and is connected with the secondary coil 132 of the high frequency transformer for outputting and providing stable DC power supply.

Preferably, the AC/DC conversion circuit 1 further includes a power main control chip 15, a photoelectric coupling circuit 16 and a feedback circuit 17. The power main control chip 15 is electrically connected with the high frequency transformer 13, the photoelectric coupling circuit 16 and the feedback circuit 17 respectively. The feedback circuit 17 is electrically connected with the high frequency transformer 13, and the photoelectric coupling circuit 16 is electrically connected with the synchronous rectification circuit 14. Specifically, all the components of the AC/DC conversion circuit 1 are arranged in designed safety spacing (preferably more than 6 mm) therebetween.

Specifically, the power main control chip 15 is preferably CX7509C chip U1 with built-in multiple protections. The photoelectric coupling circuit 16 is provided with a photoelectric coupling sensor 160 which can effectively and safely isolate AC high voltage and DC low voltage through photoelectric conversion synchronous input and output. The CX7509C chip U1 is respectively connected with the primary coil 131 of the high frequency transformer, the photoelectric coupling sensor 160 and the feedback circuit 17, for stabilizing the output voltage.

In particular, the CX7509C chip U1 has eight pins, i.e., through a first pin to an eighth pin. The fifth pin, the sixth pin, the seventh pin and the eight pin are electrically connected with the high-frequency transforming primary coil 131 of the high-frequency transformer 13. The second pin is electrically connected to the resistance R3 and the resistance R2 and then electrically connected to a positive pole of the capacitance EC2. The fourth pin is connected with two parallel resistors and is then grounded, and the first pin is grounded. The third pin is electrically connected with the photoelectric coupling sensor 160. The feedback circuit 17 includes a high frequency voltage feedback stage coil, a polar capacitor EC3, a capacitor C2, a resistor R6 and a diode D2. The polar capacitor EC3 and the capacitance C2 are connected in parallel. One end of the high frequency voltage feedback stage coil is connected with the capacitance C2 and the negative pole of the polar capacitor EC3. The other end of the feedback stage coil of high-frequency transformer is connected with a positive side of the diode D2. The negative pole of the diode D2 is connected with the resistance R6, and the other end of the resistance R6 is connected with the capacitance C2 and a positive pole of the polar capacitance EC3 respectively. One end of the capacitance C2 is connected with the second pin of the CX7509C chip U1, and the other end of the capacitance C2 is connected with the photoelectric coupling sensor 160.

Preferably, the DC power output circuit 2 also includes a USB power output interface 22 to charge the mobile terminal, and the USB power output interface 22 is electrically connected with the charging protocol circuit 21.

Preferably, the charging protocol circuit 21 has a charging protocol chip U3, which is preferably a CX2919C chip with type-C protocol. The CX2919C chip has a plurality of pins. The plurality of pins beneficially comprises nine pins, i.e., from a first pin through a ninth pin. The first pin and the third pin of the chip U3 are electrically connected with the synchronous rectification circuit 14. The second pin and the third pin of the chip U3 are respectively electrically connected with the photoelectric coupling circuit 16 to effectively and safely isolate AC high voltage from DC low voltage, and the ninth pin of the chip U3 is grounded. Specifically, the type-C protocol of the CX2919C chip can support an automatic wake-up when the type-C device is inserted, intelligently identify positive and negative insertion of the plug, and then realize the connection. The charging protocol circuit 21 can intelligent identify and output voltage and current in line with the protocol, for intelligent charging for mobile phones, computers, tablets, mobile power supply and other electronic products, with complete OVP, OCP, UVP and other protection functions.

Preferably, the USB power output interface 22 has a type-C chip. The type-C chip has a pin A1, a pin A4, a pin A5, a pin A6, a pin A7, a pin A9, a pin A12, a pin B1, a pin B4, a pin B5, a pin B6, a pin B7, a pin B9 and a pin B12. The fourth pin of the charging protocol chip U3 is connected with the pin A6 and the pin B6. The fifth pin of the charging protocol chip U3 is connected with the pin A7 and the pin B7. The sixth pin of the charging protocol chip U3 is connected with the pin A5. The seventh pin of the charging protocol chip U3 is connected with the pin B5. The eighth pin of the charging protocol chip U3 is connected with the pin A4, the pin B4, the pin A9 and the pin B9, and the pins A1, A12, B1 and B12 are grounded.

Specifically, the earphone charging circuit 3 comprises a DC/DC power conversion circuit 31, a charging management/lithium battery protection circuit 32, an earphone charging interface 33 and a charging battery 34. The charging protocol circuit 21 is electrically connected with the DC/DC power conversion circuit 31. The DC/DC power conversion circuit 31, the charging management/lithium battery protection circuit 32 and the earphone charging interface 33 are electrically connected in turn. The charging battery 34 is electrically connected with the charging management/lithium battery protection circuit 32. The earphone charging interface 33 is configured for charging the earphone, and the charging battery 34 is configured for energy storage of the earphone and charging the earphones.

Preferably, the DC/DC power conversion circuit 31 has a power conversion chip 310 for stabilizing the output voltage at 5V to charge the earphones. The power conversion chip 310 has an IN end and an OUT end. The eighth pin of the charging protocol chip U3 is connected with the IN end, and the OUT end is electrically connected with the charging management/lithium battery protection circuit 32.

Further, the charge management/lithium battery protection circuit 32 has a charge management/battery protection chip U5, which is preferably FM9688 chip. The FM9688 chip is respectively connected with the power conversion chip 310, the charging battery 34 and the earphone charging interface 33.

Preferably, the photoelectric coupling sensor 160 comprises a photoelectric coupling sensor U4-A and another photoelectric coupling sensor U4-B. The photoelectric coupling sensor U4-A is electrically connected with the second pin and third pin of the charging protocol chip U3, and the photoelectric coupling sensor U4-B is electrically connected to the third pin of the CX7509C chip U1.

Figure 3:
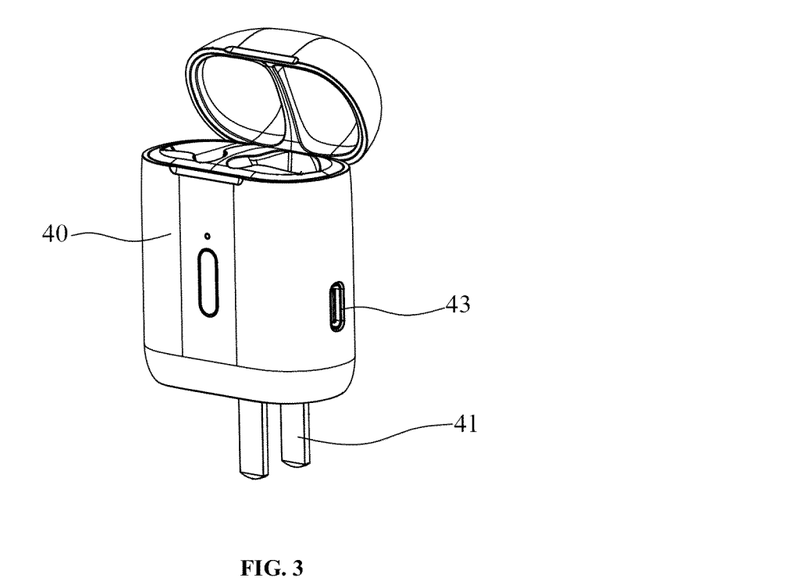
FIG. 3 is a schematic perspective view of the earphone charging bin with adapter function in an open state in according to the embodiment of the present invention.
Figure 4:
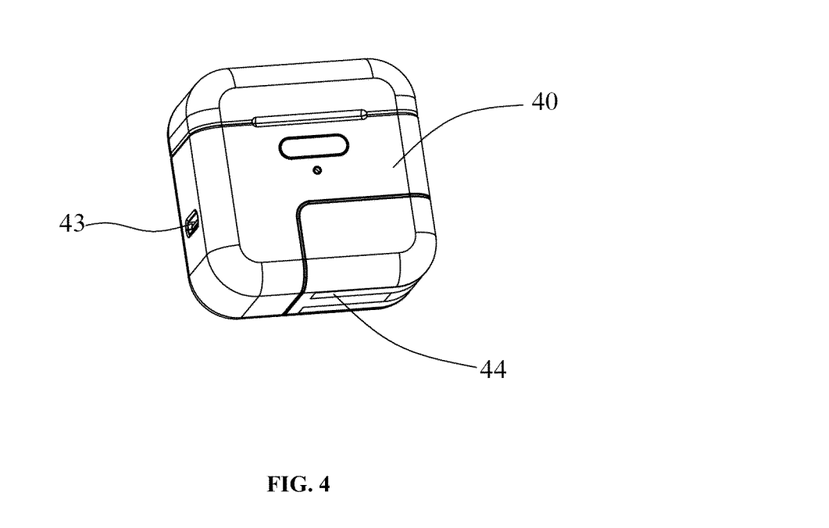
FIG. 4 is a schematic perspective view of the earphone charging bin with adapter function in according to the embodiment of the present invention.

Referring to FIG. 3 and FIG. 4, the earphone charging case 100 with adapter function comprises an enclosure 40, an AC/DC conversion unit 1, a DC power output circuit 2 and an earphone charging circuit 3 respectively disposed in the enclosure 40. The enclosure 40 is provided with an electric plug 41 for connecting with an external power supply. Earphone charging contacts are provided in the enclosure 40 and are electrically connected with the earphone charging interface 33. The enclosure 40 is further provided with a charging output interface 43 which is connected with the USB power output interface 22 to charge the electronic products. Preferably, the enclosure 40 is further provided with a receiving slot 44. The electric plug 41 is configured to be capable of being overturned and installed in the receiving slot 44 so that the electric plug 41 is able be folded and received in the receiving slot 44, and the electric plug 41 is further configured for connecting the alternating current. The electric plug 41 in a status of turning outward is vertical to one side or surface of the enclosure 40. The electric plug 41 is configured to be folded and received in the receiving slot 44 and to be substantially even with the side or the surface of the enclosure 40 in a receiving status. The electric plug 41 is further configured to be manually rotatable, is thus able to be rotated outward by hand when charging and hidden in the receiving slot 44 after using.

Furthermore, in the earphone charging case 100 with adapter function, in order to use electricity safely and reduce mutual interference between circuits, PCB boards are effectively and safely isolated by insulating material components. AC alternating circuit (high voltage 100-240V) in the AC/DC conversion circuit 1 and DC output (low voltage 5-20 v) of the DC power output circuit 2 are arranged with a separated layout and effectively and safely isolated from each other. The AC/DC conversion circuit 1 and the DC power output circuit 2 are effectively and safely isolated by insulating material components. In addition, a chamber of the earphone charging case 100 perfuse with high-efficiency heat dissipation material, which reduces temperature rise of the product and solves the heating problem caused by small volume and space of the product.

In another embodiment of the present invention, another earphone charging case with adapter function is provided, which comprises an enclosure 40, an AC/DC conversion unit and a DC/DC conversion unit. The AC/DC conversion unit and the DC/DC conversion unit are respectively disposed in the enclosure 40. The enclosure 40 is provided with an electric plug 41 for connecting with an external power supply and earphone charging contacts which are electrically connected with the DC/DC conversion unit. The enclosure 40 is further provided with a charging output interface 43 which is connected with the AC/DC conversion unit to charge the electronic products. Preferably, the AC/DC conversion unit comprises the AC/DC conversion circuit 1 and the DC/DC conversion unit comprises the DC power output circuit 2. The DC/DC conversion unit comprises the earphone charging circuit 3. The internal circuit structure of the earphone charging case in this embodiment refers to the circuit principle of these embodiments described above and will not be described here again.

In addition, the electric plug 41 is configured for connecting the alternating current. The electric plug 41 in a status of turning outward is vertical to one side or a surface of the enclosure 40. The electric plug 41 in a status of being folded in the receiving slot 44 is substantially even or flush with the side or the surface of the enclosure 40. In a specific embodiment, the DC/DC conversion unit is a step-down converter, and the AC/DC conversion unit is connected with the DC/DC conversion unit to convert the output voltage of the AC/DC conversion unit into the DC voltage for charging the earphones.

In the earphone charging case 100 with adapter function described above, the earphone charging case is integrated together with the power adapter, and structure space of the whole charging case is fully utilized, thereby achieving a reasonable expansion function. Further, the earphone charging case 100 has a compact structure and provides convenience when using it. Two kinds of traditional single function product as standard peripheral products required in the mobile phones are integrated into a multi-functional product. By setting circuit components within safe distance, the influence between circuits is minimized. The electric plug 41 is configured reasonably in the mechanism to be manually rotated outward for use when charging. After using, it is hidden in the receiving tank 44, thereby providing convenience for carrying and attractive configuration.

The above are described as embodiments of the present invention, however, it is no way intended to limit the present invention to these embodiments. Any changes, equivalences and modifications within the spirit and scope of the present invention should be encompassed within the scope appended claims.

What is claimed is:

1. An earphone charging case with adapter function, comprising an AC/DC conversion circuit, a DC power output circuit and an earphone charging circuit, the DC power output circuit being provided with a charging protocol circuit, the AC/DC conversion circuit being electrically connected with the charging protocol circuit, the charging protocol circuit being electrically connected with the earphone charging circuit, and the AC/DC conversion circuit being configured for accessing an alternating current and converting the alternating current into a direct current, the earphone charging circuit being configured for charging a battery in the earphone charging case and earphones, and the DC power output circuit being configured for charging mobile terminals, wherein the AC/DC conversion circuit comprises an AC input end, a rectification bridge stack, a high-frequency transformer, a synchronous rectification circuit, a power main control chip, an optoelectronic coupling circuit and a feedback circuit, the AC input end being an input end of the AC/DC conversion circuit and being configured for connecting with the alternating current, the AC input end, the rectification bridge stack, the high-frequency transformer and the synchronous rectification circuit being electrically connected in turn, the power main control chip being electrically connected with the high frequency transformer, the optoelectronic coupling circuit and the feedback circuit respectively, the feedback circuit being electrically connected with the high frequency transformer, and the optoelectronic coupling circuit being electrically connected with the synchronous rectification circuit.

2. The earphone charging case with adapter function of claim 1, wherein the DC power output circuit further includes a USB power output interface to charge the mobile terminals and the USB power output interface is electrically connected with the charging protocol circuit.

3. The earphone charging case with adapter function of claim 2, wherein the earphone charging circuit comprises a DC/DC power conversion circuit, a charging management/lithium battery protection circuit, an earphone charging interface and a charging battery, the charging protocol circuit being electrically connected with the DC/DC power conversion circuit, wherein the DC/DC power conversion circuit, the charging management/lithium battery protection circuit and the earphone charging interface are electrically connected in turn, the charging battery is electrically connected with the charging management/lithium battery protection circuit, the earphone charging interface is configured to charge the earphones, and the charging battery is configured for energy storage of the earphone and charging the earphones.

4. The earphone charging case with adapter function of claim 3, wherein the charging protocol circuit has a charging protocol chip which has a plurality of pins, the plurality of pins beneficially comprises nine pins from a first pin through a ninth pin, the synchronous rectification circuit has a rectification chip, the first pin and the third pin are electrically connected with the rectification chip, respectively, and the second pin and the third pin are respectively electrically connected with the optoelectronic coupling circuit.

5. The earphone charging case with adapter function of claim 4, wherein the DC/DC power conversion circuit has a power conversion chip which has an IN end and an OUT end, the eighth pin of the charging protocol chip is connected with the IN end, and the OUT end is electrically connected with the charging management/lithium battery protection circuit.

6. The earphone charging case with adapter function of claim 4, wherein the optoelectronic coupling circuit has photoelectric coupling sensors, which comprises a photoelectric coupling sensor U4-A and another photoelectric coupling sensor U4-B, wherein the photoelectric coupling sensor U4-A is electrically connected with the charging protocol chip, and the photoelectric coupling sensor U4-B and the power main control chip are electrically connected to each other.

7. The earphone charging case with adapter function of claim 4, wherein the earphone charging case with adapter function has an enclosure which the AC/DC conversion circuit, the DC power output circuit and the earphone charging circuit are respectively arranged in, wherein the enclosure is provided with an electric plug, earphone charging contacts and a charging output interface, the electric plug is configured for connecting an external power supply, the earphone charging contacts are electrically connected with the earphone charging interface, and the charging output interface is connected with the USB power output interface to charge electronic products.

8. An earphone charging case with adapter function, comprising an enclosure, an AC/DC conversion unit and a DC/DC conversion unit, the AC/DC conversion unit and the DC/DC conversion unit being respectively disposed in the enclosure, which is provided with an electric plug for connecting with an external power supply and earphone charging contacts which are electrically connected with the DC/DC conversion unit, the enclosure being further provided with a charging output interface which is connected with the AC/DC conversion unit to charge electronic products, wherein the DC/DC conversion unit is a step-down converter and the AC/DC conversion unit is connected with the DC/DC conversion unit to convert output voltage of the AC/DC conversion unit into DC voltage for charging the earphones, the AC/DC conversion unit comprises an AC/DC conversion circuit and the DC/DC conversion unit comprises a DC power output circuit, the AC/DC conversion circuit comprises an AC input end, a rectification bridge stack, a high-frequency transformer, and a synchronous rectification circuit, wherein the AC input end is an input end of the AC/DC conversion circuit and is configured for connecting with the alternating current, the AC input end, the rectification bridge stack, the high-frequency transformer and the synchronous rectification circuit is electrically connected in turn, and the AC/DC conversion circuit further comprises a power main control chip, an optoelectronic coupling circuit and a feedback circuit, the power main control chip being electrically connected with the high frequency transformer, the optoelectronic coupling circuit and the feedback circuit respectively, the feedback circuit being electrically connected with the high frequency transformer, and the optoelectronic coupling circuit being electrically connected with the synchronous rectification circuit.

9. The earphone charging case with adapter function of claim 8, wherein the enclosure is further provided with a receiving slot, wherein the electric plug is configured to be capable of being overturned and installed in the receiving slot so that the electric plug is able be folded and received in the receiving slot, and the electric plug is further configured for connecting the alternating current, the electric plug in a status of turning outward is vertical to one side or surface of the enclosure, the electric plug in a status of being folded in the receiving slot is substantially even with the side or the surface of the enclosure.

10. The earphone charging case with adapter function of claim 8, wherein the DC power output circuit is provided with a charging protocol circuit, the AC/DC conversion circuit is electrically connected with the charging protocol circuit, the charging protocol circuit is electrically connected with the earphone charging circuit, the DC power output circuit further includes a USB power output interface to charge the mobile terminals and the USB power output interface is electrically connected with the charging protocol circuit.

11. The earphone charging case with adapter function of claim 10, wherein the DC/DC conversion unit comprises an earphone charging circuit which comprises a DC/DC power conversion circuit, a charging management/lithium battery protection circuit, an earphone charging interface and a charging battery, wherein the charging protocol circuit is electrically connected to the DC/DC power conversion circuit; the DC/DC power conversion circuit, the charging management/lithium battery protection circuit and the earphone charging interface are electrically connected in turn, the charging battery is electrically connected with the charging management/lithium battery protection circuit, the earphone charging interface is configured to charge the earphones, and the charging battery is configured for energy storage of the earphone and charging the earphones.

12. The earphone charging case with adapter function of claim 11, wherein the charging protocol circuit has a charging protocol chip which has a plurality of pins, the plurality of pins beneficially comprises nine pins from a first pin through a ninth pin, the synchronous rectification circuit has a rectification chip, the first pin and the third pin are electrically connected with the rectification chip, respectively, and the second pin and the third pin are respectively electrically connected with the optoelectronic coupling circuit.

13. The earphone charging case with adapter function of claim 12, wherein the DC/DC power conversion circuit has a power conversion chip which has an IN end and an OUT end, the eighth pin of the charging protocol chip is connected with the IN end, and the OUT end is electrically connected with the charging management/lithium battery protection circuit.

14. The earphone charging case with adapter function of claim 13, wherein the optoelectronic coupling circuit has photoelectric coupling sensors, which comprises a photoelectric coupling sensor U4-A and another photoelectric coupling sensor U4-B, wherein the photoelectric coupling sensor U4-A is electrically connected with the charging protocol chip, and the photoelectric coupling sensor U4-B and the power main control chip are electrically connected to each other.

* * * * *